Aug. 23, 1938.     C. B. HUNTMAN     2,127,518
STABILIZER SHOCK ABSORBER FOR MOTOR CARS
Original Filed May 14, 1934     2 Sheets-Sheet 1
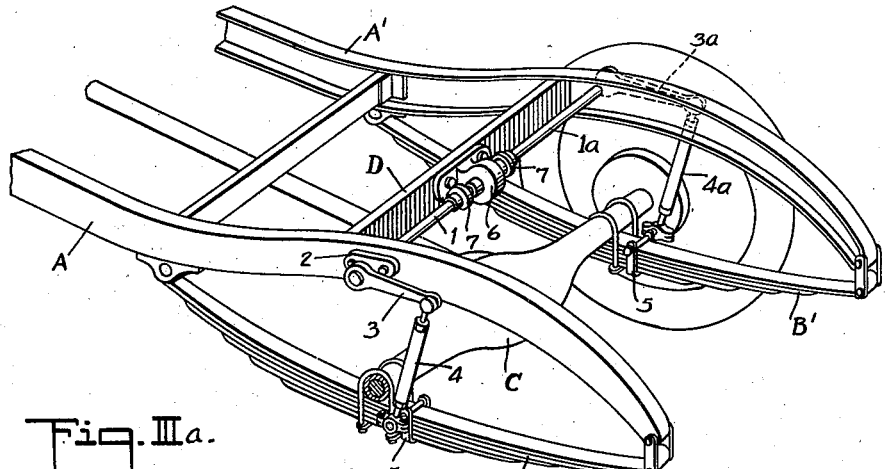
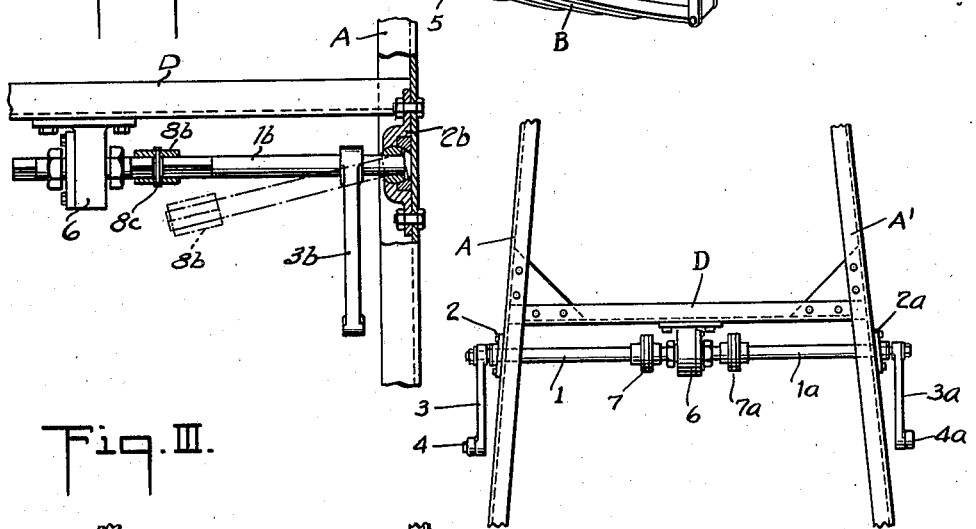
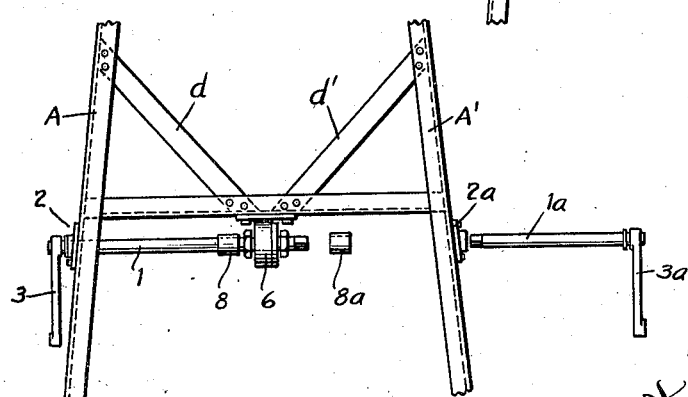
INVENTOR
Charles B. Huntman
BY
ATTORNEY

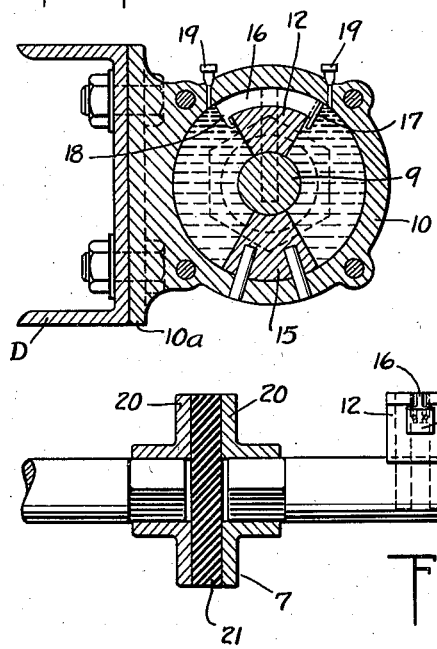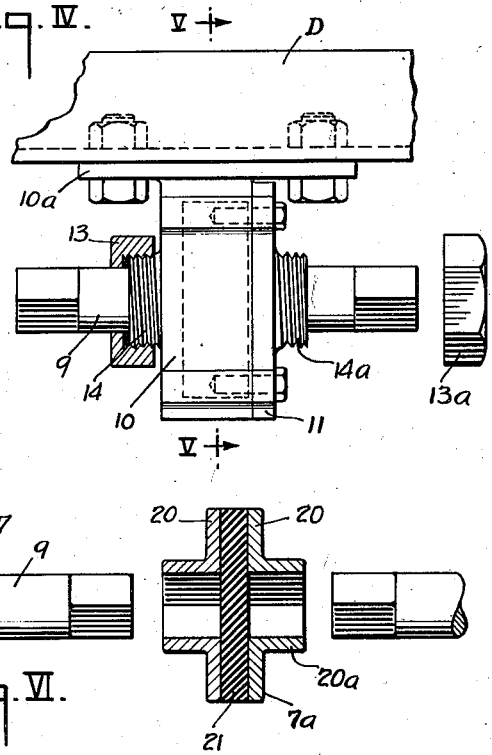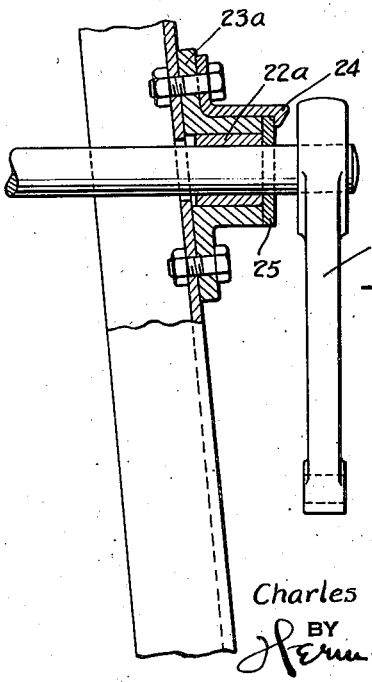

Patented Aug. 23, 1938

2,127,518

UNITED STATES PATENT OFFICE 2,127,518

STABILIZER SHOCK ABSORBER FOR MOTOR CARS

Charles B. Huntman, Plainfield, N. J.

Continuation of application Serial No. 725,432, May 14, 1934. This application October 16, 1935, Serial No. 45,243. Renewed November 17, 1937

20 Claims. (Cl. 267—11)

This invention relates to the equalizing or balancing of shocks such as are involved in motor cars when the wheels on one side are displaced by the uneven contour of the road, or when centrifugal strain tends to careen the body when a car at speed is deflecting its course. It involves the absorbing of such shocks or strains, balancing the effect of the strains on both sides of the car, dampening the reaction of any wheel or body displacement due to such shocks or unequal force on opposite sides of the car, and various other advantages which will appear from the more detailed description hereinafter set forth and be pointed out in the claims.

This application is a continuation of my co-pending application Serial No. 725,432 filed May 14, 1934. It involves certain of the subject-matter in said copending prior application and relates to adaptations thereof and species or forms, as well as modifications of the invention set forth in my Patent No. 1,971,961 issued August 28, 1934.

This application represents varied developments of my invention broadly covered in my patents granted August 28, 1934, Nos. 1,971,957 and 1,971,958, namely, motor car equipment which has now become known as the stabilizer-shock-absorber rigging, which has for its purpose the improvement of the riding qualities of a motor car in motion, which may be referred to as ride-ease on rough roads as well as when a car turns from a straight course.

More specifically, the subject-matter hereof includes the combination of structure adapted for the ready assembly of the cross-car force transmitting means, such as a bar or bars, and simplified means for attachment thereof to the shock-absorber means cooperating with the cross-car stabilizing means.

Further objects involve improved adaptations of the single shock-absorber, for compactness, simplicity and economy of construction.

Also simplified means of construction and assembly for the purpose of absorbing slight initial road irregularities to avoid the transmission of vibration to the sprung mass of the car, and therefore to the load, particularly to persons riding in the car, which slight initial vibrations are now frequently referred to as boulevard jitters. It is for the purpose of avoiding such initial vibration while still preserving the proper functioning of the combination stabilizer-shock-absorber structure of the equipment.

The invention herewith illustrated and which will be specifically described, includes a species of a single shock-absorber unit to which the shock force from the road wheels is delivered from each side of the car by means of a torque-bar or tube or the like, while modifications of the means of force transmission are within the purview of the claims of this application. This shock-absorber unit is preferably attached between the sills or side members of the frame of the car, or the sides of the body in case there is no separate side frame member. The unit, however, may be placed nearer one side or secured at one side, in which case the force transmitting member extends from the opposite side of the car, and the shock transmitting member on the near side may be direct to the shock-absorber.

With the single hydraulic shock-absorber as illustrated, which permits more free action on shock impact and dampening on the recoil, the construction provides for the attachment of the shock-absorber unit, rigidly into a predetermined position, and thereafter the side torque-connections are readily slipped into place with suitable bearings at their ends, and having suitable couplings at each side of the shock-absorber unit.

In the construction illustrated and in combination therewith, or in some respects as independent features, I provide a bearing on the outside of each side frame member in such a manner that the shock-arm which is linked to the unsprung mass such as the axle end or the spring adjacent to the axle end, with a short section of torque-bar or tube which may be inserted from the side of the assembled frame, and with a simple coupling it engages one side of the shock-absorber in such a manner as to assure proper functioning, and after such simple insertion a clip or other suitable mechanical means locks the torque-bar and the shock-arm into its position against any accidental removal.

Furthermore, in the couplings connecting the two, so-to-speak, half torque-bars to the shock-absorber unit, I provide a coupling which embodies a slight degree of flexibility, so that any disalignment of the axis of the shock-absorber with the outboard bearings of the torque-bars, is compensated during the shock oscillation of the levers without straining any of the fixed bearings either on the shock-absorber or on the sills.

Coupled with the readily assemblable features and the single shock-absorber type, of my stabilizer shock-absorber equipment as herein illustrated, I provide a means whereby the shock-absorber element can be rigidly secured into its permanent position, and in a form that can be refilled with oil, or the desired fluid when necessary, and an exceedingly simple method of thereafter connecting the shock lever and torque or car transverse force transmission, without the necessity of any absolute alignment or without any other close tolerances of parts, and particularly the bearings in the manufacture of the various parts of the equipment.

In forms as herein described, any slight angular variation of the torque-bar in its out-board bearing is accommodated readily, amply within the range of any variation experienced in quantity production, for quick assembly, or any variation that may be caused by weaving of a frame in the ordinary course of operation of the car on the roughest roads. With this the shock-arm connection with the link through which the movement of the unsprung mass is transmitted by the displacement of the wheel and axle end, likewise accommodates any and all of the variations that might exist due to changes of dimensions in manufacture of parts or assembly, or due to the displacements and strains when operating over rough roads. In some forms during assembly, a larger angular variation of the torque-bar is necessary and that also may be accommodated at bearing or bearings, while still assuring proper functioning and wear when the mounting of the stabilizer-shock-absorber rigging is complete.

In the accompanying drawings illustrating particular forms of construction:

Fig. I is a perspective view from the side, rear and top of one end of a motor car frame and axle, with the assembled stabilizer-shock-absorber construction in one form.

Fig. II is a plan of the stabilizer-shock-absorber as assembled, showing adjacent parts of a motor car frame fragmentary.

Fig. III is a view similar to Fig. II, showing parts of the stabilizer-shock-absorber separated, to illustrate the assembly or removal of parts.

Fig. III$^a$ is a view similar to Fig. III showing, on a larger scale, the shock-absorber and one of the torque-bar sections mounted in a modified manner.

Fig. IV is a fragmentary plan view, on a much larger scale, of one form of shock-absorber as attached to adjacent frame member.

Fig. V is a sectional view of the shock-absorber as mounted, on line $v$—$v$ of Fig. IV.

Fig. VI is a side view fragmentary, on the same scale as Fig. IV, of the shock-absorber shaft with couplings and adjacent ends of the stabilizer bar sections.

Fig. VII is a plan view with bearings in section, showing one form of outboard support of a stabilizer bar section.

Fig. VIII is a view similar to Fig. VII, showing modified form of outer bearing of a stabilizer bar section.

As illustrated, the motor car chassis parts include sills or side frame members A, A', main springs B, B', axle housing C attached to the springs and supporting the road wheels, one shown. A suitable cross-frame member D extends between the sills A, A' and may have diagonal bracing $d$, $d'$, if desired, to provide ample rigidity for the middle portion of frame D.

Cross-car stabilizer bar sections 1, 1$^a$ are mounted in bearings 2, 2$^a$ on the sills or side frame members, and at the outer end of each bar section there are firmly secured shock levers 3, 3$^a$, adapted upon their oscillation about the axis of the bar to each turn its bar section in direct proportion to the movement of the shock lever, each of which is connected by a link 4, 4$^a$ to an end of the wheel-supporting axle, such connection of the link may be, as illustrated, by means of a coupling to a clip 5 on the main spring close to the spring seat, or in any other manner secured so that the lower end of each link 4, 4$^a$ responds fully to the relative vertical movement of the axle end and wheel with respect to the frame.

The sills or side frame members and direct or diagonal cross-bracing, with the body for passengers or goods, thus constitute the sprung mass which is carried by the main springs attached to the unsprung mass comprising the axle, housing with wheels and associated parts. The stabilizer-shock-absorber equipment or rigging is thus assembled with the sprung mass and unsprung mass, in a manner that assures the functioning of cross-car stabilizing as well as shock-absorbing with respect to the movement of the axle ends and the sprung mass, for which the connection at the unsprung mass must be responsive to the movement of the axle ends by any desired form of attachment, which assures such movement of the same magnitude as the wheels or wheel-borne members.

Thus in Fig. II the link and shock arms and stabilizer bar sections when assembled are connected with the shock-absorber 6, which as a unit is attached rigidly to a frame member and has its oscillatable shaft extending laterally from each side of the shock-absorber casing in substantial alignment with the stabilizer bar sections, 1, 1$^a$. The shock-absorber shaft ends are coupled to the inner ends of the stabilizer bar sections by flexible couplings 7, 7$^a$, more particularly described hereafter.

In Fig. III the construction is still further simplified for cases where production readily provides accurate alignment of the axis of the shock-absorber shaft and the stabilizer shaft sections, so that the inner ends of the stabilizer bar section slip directly into a socket or other suitable coupling, thus reducing parts and cost. As there illustrated, one of the stabilizer sections 1$^a$ with its shock-arm 3$^a$, is shown as a unit removed from its assembled position, to more clearly illustrate the process of assembly. While various forms of connection at shock-absorber may be used, sleeves 8, 8$^a$ present a simple form.

In the forms just described, it will be seen that the simplicity of assembly requires that no portion of the stabilizer bar section has any integral portion greater in diameter than the diameter of the bearing through which the bar must be inserted for assembly. Such conditions are met as more particularly illustrated on the larger scale drawing of parts and hereinafter described in detail. Likewise, for the assembly of the shock-absorber the laterally protruding shaft ends cannot be of greater diameter as to any integral portion, than the bearings in the shock-absorber case and cover, which is also fully set forth in larger scale views and described in detail hereafter.

In Fig. III$^a$ the construction and arrangement is modified to meet any desire to mount the shock-lever inside the sill. This may be preferred to avoid perforating the web of the frame member, or for more satisfactorily meeting the conditions of axle end attachment, or other reason. However, when the outside position of lever is desired, as in other figures, the hole for passage of the torque-bar can be in the neutral axis of strains in the frame member, or a reinforcement of the frame web may be resorted to.

As shown in Fig. III$^a$, the shock-absorber 6 may be similar to that used in other forms, and the torque-bar section 1ᵇ may have the shock-arm 3ᵇ permanently assembled to form a unit.

The bar outer end may then be inserted in a bearing having a part spherical outside, or a bushing similarly adapted to permit angular movement of the bar during assembly, in order to assure its proper support in the bearing bracket 2ᵇ. It is then brought into alignment with the axis of the shock-absorber shaft, and a sleeve as 8ᵇ with a square broached hole corresponding to the end of the shaft and the torque-bar, is slipped over the absorber shaft end and a locking means, such as pin 8ᶜ is then inserted through the sleeve and assures the permanency of the coupling.

Figs. IV, V and VI show, on a larger scale, a form of hydraulic shock-absorber which I have made and used with complete success, and which is illustrated in its essential shock-absorber elements in my Patent No. 1,971,960 granted August 28, 1934, where the stabilizer bar or cross-car force transmitting means was attached on one side only, while in the present case the shock-absorber shaft 9 is double ended projecting from each side of shock-absorber casing 10. The casing has the removable plate 11 on one side so that when the casing is open the shaft with its abutment 12 attached may be inserted, the plate 11 then secured in place, and a gland on each side 13, 13ᵃ forming stuffing boxes are respectively screwed onto the threaded boss 14 on the casing proper and 14ᵃ on the detachable plate 11.

The interior of the shock-absorber has an abutment 15 rigidly secured to the inside of the casing forming the outer wall of the annular cylinder, while the piston 12 adapted to oscillate with the shaft 9, is rigidly attached to the shaft and has at its outer periphery a slip valve member 16 which rests in a slot extending from side-to-side of the piston 12, and is of such form and dimensions that it engages an appreciable surface of the cylinder wall in order that the valve member 16 will lag for predetermined slight movement with respect to the piston. This valve member 16 has a plate 17 at one end which constitutes a valve head that does not however completely seat itself, but permits relatively restricted passage of oil through the slot in the periphery of the piston which is of greater section than the section of the valve member 16. At the other end of valve member 16 a claw 18 limits the movement of the valve in the opposite direction, but does not restrict the flow of oil through the slot and past the valve member 16, thus allowing oil to flow in one direction restricted only by the free space in the slot and relatively freer than the flow in the opposite direction restricted by the valve head 17. To fill the annular cylinder I provide oil holes 19, which preferably penetrate the inner wall of the casing close to each side of the piston member and are preferably on the top side of the casing, so that the oil or other fluid medium used can be projected into the casing to fill it to the top without any air space. The holes and caps or other suitable closure can be made of such dimensions as to provide the desired excess of oil to assure that the cylinder is completely filled, even with variation of temperature, but as here illustrated I have found the construction satisfactory in continued use.

The shock-absorber casing 10 has on one side a broad base 10ᵃ, preferably formed integral therewith, which provides for the attachment of the shock-absorber unit to the frame cross member D, in a manner adapted to rigidly resist the turning moment on the casing due to the stabilizer torque strain. If desired, such casing support may be modified in various ways such as extending integral bosses on opposite sides adapted for attachment to two cross members of the frame, which for some usage may effect a lighter or more simple construction and one easier to assemble on the car.

As shown in Fig. VI, the couplings 7, 7ᵃ between the shock-absorber shaft and the stabilizer bar sections consist of two rigid flanges 20, each having a hub 20ᵃ with its opening broached square, or in other suitable manner adapted to fit a similar section of the end of each torque-bar section and the shock-absorber shaft ends with a tight-sliding fit, and assure the full transmission of rotary force transmitted from either side of the coupling. These flanges 20 are, in the form shown, separated by a rubber disc 21 which is vulcanized to the inner face of each of the flanges 20, in a manner usual in the vulcanizing of rubber to metal. This provides for the torque strains being transmitted through the rubber, but in the case of any slight disalignment of the axis of the torque-bar section with the axis of the shock-absorber, the rubber yields to accommodate it without causing any strain or binding of the bearings of the shock-absorber shaft in its casing. Thus the shock-absorber unit may be rigidly attached in its position and the assembly of the stabilizer connections is assured with perfect functioning connections irrespective of the necessity of expensive accurate alignment, and with far larger tolerances in manufacture and construction of associated parts.

In the case of slight disalignment, the bearing at the side frame member may be as shown in Fig. VIII in which a bearing bushing 22 closely fits the stabilizer bar cylindrical end, but the outer surface of this bushing is spherical and is held by a corresponding spherical cavity, half in the bearing bracket 23 and the other half in a collar pressed into the bracket, after which the bracket is attached to the web of the sill or side frame member holding the collar permanently in place. This form, shown on the inside of the sill web may be similarly embodied wherever the bearing is located. In Fig. VII the bearing is attached on the outside of the sill web, so that support of the stabilizer bar section is provided as close as possible to the end where the torque strain is delivered by the shock lever 3. In the form there shown, a bearing and bracket 23ᵃ is formed to accommodate a slight angle due to forms of frame with diverging side sills, and has a straight bushing 22ᵃ which would be used where the accuracy of production and convenience of assembly do not require the accommodation of any slight disalignment. In this form there is shown a spring clip 24 with a hooked end adapted to engage a collar 25, preferably pressed onto the end of the shaft, the hook and collar cooperating to hold the shaft in its assembled position after it has been inserted through the bearing and into the coupling connecting it with the shock-absorber. The shock lever 3 is preferably likewise pressed onto the end of the torque-bar in a manner that holds it rigidly to turn the bar and turn in unison with the force transmitted by the bar, but the attachment may be with a polygonal end and corresponding broached hole in the hub of the lever, or a key or other suitable means may be used to assure rigidity of attachment. Instead of the collar 25 in Fig. VII, it is preferable in some cases to provide a thimble 25ᵃ as shown in Fig. VIII, which can be of substantial diameter and forced on to the end of the torque-bar section, providing a large area of contact, which contact can include a turned section at the end of the bar with a very slight shoulder to position the thimble and its end flange 25ᵇ. The thimble may be made of different metal than the bar and thus provide a more accurate and bigger bearing surface with the bushing 22, which in turn provides a larger diameter for the curvature of the outer spherical surface for its engagement with the bracket 23 and the pushed in holding-ring 23ᵇ. The clip 26 may be held by one of the same bolts that hold the bracket 23 to the web of the side sill, while engaging the flanged end of the thimble, and thereby assuring the positive holding of the bar section in its assembled position.

It will thus be seen that the stabilizer-shock-absorber equipments as herein described, will be simple for production and simple for assembly, as they provide the following:

Each end section of stabilizer bar may be made of a uniform round or tubular stock from end-to-end, the inner end may be squared, and after the assembly by pressing on a thimble or collar at the outer end and then pressing on the shock lever, the unit may be inserted through the previously attached bearing on the side sill. When a thimble is used the inside diameter of the bearing will be larger, and therefore permit quick and easy insertion and still an accurate fit at the outboard bearing end.

The shock-absorber unit is completed and may be attached at any desired step in the assembly of the chassis. By the use of either a direct, simple coupling between inner ends of the torque-bar and shock-absorber shaft the assembly is completed without the necessity of any attachment whatsoever and becomes permanent with a suitable locking device, such as illustrated, or otherwise. While I prefer a locking device on the side of the car where the operation after insertion of the torque-bar section can most readily be accomplished, it also permits easy access to remove the bar, if desired. In case the slightly flexible or cushioning rubber coupling, shown in Fig. VI, is desired, the assembly is equally simple, avoids any looseness of parts and assures any chance of binding in the case of differences of fits in quantity production or due to weaving of body frame. The latter is also furthermore assured as to prevention of binding and facility of assembly by the automatically adjustable spherical bearing shown in Fig. VIII, or its equivalent.

While the reversal of parts may be resorted to, namely, by supporting the shock-absorber and the stabilizer bar sections at the unsprung mass, in its preferred form the major weight of the entire stabilizer-shock-absorber equipment is preferably carried on the sprung mass. Likewise, the parts may be positioned to the rear or in front of the axle with which they function, either rear axle or front axle, and other variations may be made without departing from my invention.

While I have shown a particular form of hydraulic shock-absorber and mounted the shock levers outside of the side frame members or sills, their positioning may also be varied. Variations in the couplings, and any or all of the members or parts, or their assembly, from the particular forms herein shown and described, may be made without departing from my invention.

What I claim and desire to secure by Letters Patent is:

1. In an automobile-ride-stabilizer equipment, transverse force transmitting means having two lateral end sections readily attachable and detachable to and from a fixed part of the automobile and a shock-absorber fixed to the sprung mass intermediate said sections of the transverse force-transmitting means, and connections on each side of the shock-absorber permitting ready detachment of both sections of the transverse force transmitting means without detaching the shock absorber.

2. In an automobile ride-stabilizer equipment, a single shock-absorber supported by fixed members on the automobile frame, a torque-bar section extending from each side of said shock-absorber with one end supported thereby and having means of support for the outer end of each torque-bar section, both supports permitting ready detachment of the torque-bar sections without detaching the shock-absorber.

3. A stabilizer-shock-absorber for motor cars having a single shock-absorber fixed to the motor car frame, two torque-bar sections respectively extending from each side of the shock-absorber transversely to a bearing on the laterally outer member of the frame, and each having coupling means for functionally connecting their inner ends to the shock-absorber permitting removal of the torque-bar sections without removal of the shock-absorber.

4. In an automobile stabilizer-shock-absorber equipment having means of support on the frame of the automobile, comprising a transverse torque-bar in two sections, bearings on the sides of the frame adjacent the outer end of each torque-bar section, a shock-absorber rigidly attached to the frame between its sides, and readily attachable and detachable coupling means between the inner end of each torque-bar section and the shock-absorber at the opposite sides thereof.

5. In an automobile stabilizer-shock-absorber equipment, comprising an hydraulic shock-absorber fixed to the frame, a shaft supported therein, detachable torque-bar sections at each side in substantially axial alignment with the shaft of the shock-absorber, and means for ready attachment and detachment of the torque-bar sections from the shock-absorber shaft.

6. In an automobile stabilizer-shock-absorber, equipment, transverse force transmitting means formed in two sections with the outer portion of each supported on the automobile side frame, a single hydraulic shock-absorber supported on the frame between the two sections of the transverse force transmitting means, and yielding coupling means cooperating between the force transmitting means and the shock-absorber, whereby the stabilizer-shock-absorber functioning is assured without the requirement of exact alignment of the shock-absorber and force transmitting means.

7. The combination in a motor car having a sprung mass and an unsprung mass, of readily attachable and detachable torque-bar sections at the sprung mass, comprising two sections each having its laterally outer end supported by a bearing at the sprung mass and each having its inner end supported to functionally cooperate with a shock-absorber fixed at the sprung mass, and each torque-bar section provided at its outer end with operative connections to the unsprung mass.

8. The combination with a vehicle having sprung and unsprung masses, comprising wheel-borne means, an equalizing cross-bar comprising two sections, means of pivotal support of the outer end of each section carried on a rigid part of the automobile, an hydraulic shock-absorber means intermediate the inner ends of each cross-bar section and operating in unison with both sections of the cross-bar, and operative connections between each cross-bar section and the wheel-borne means responsive to relative movement between the sprung and the unspring mass.

9. The combination in a motor vehicle having a sprung mass and an unsprung mass comprising a pair of vehicle supporting wheels, a pair of sills rigidly spaced with relation to each other forming part of the sprung mass, a cross-frame member, a single hydraulic shock absorber supported at said cross-frame member, operative connections from each side of the shock absorber including a cross-car torque-bar in sections each having a bearing on the frame, coupling means at the inner end of each section connecting it to the shock-absorber, and means operatively connecting each bar section to the unsprung mass adjacent each of said pair of wheels.

10. In an automobile stabilizing equipment, a plurality of torque-bar sections, cooperating lever arms and links connecting laterally outer sections of the bar to axle means, fixed means at each sill of the automobile adapted to oscillatably support the outer end of each bar section, and a single shock-absorber operatively associated with the inner ends of each bar section to dampen the spring reaction between the axle means and sills.

11. In an automobile ride-stabilizing equipment, an equalizing torque-bar having a plurality of sections with a total length sufficient to extend the distance between the side frame members of the automobile and adapted to have end bearings thereat, means near the ends thereof for connection with the wheels and axle, a single shock-absorber mounted rigidly on the automobile frame, one of the sections of the torque-bar forming the shaft of the shock-absorber carried in bearings therein and having means to couple the same to the adjacent end of other sections of the torque-bar.

12. In an automobile stabilizing equipment, a torque-bar formed in sections, couplings between the sections constraining them to operation in unison, cooperating lever arms and links connecting the end sections of the bar to axle means, a fixed member on each sill of the automobile providing a bearing for the bar ends, and a single shock-absorber operatively connected between the end sections of the bar, said shock-absorber being fixedly attached to the automobile frame and being so constructed and arranged as to lightly dampen spring compression and heavily dampen spring reaction.

13. In a stabilizer-shock-absorber equipment for motor cars, a single shock-absorber adapted to be fixedly secured to the sprung mass of a car, a shock-absorber shaft, a torque-bar section and shock lever, and means for ready attachment and detachment of the torque-bar section and lever to and from the shock-absorber shaft.

14. Stabilizer-shock-absorber equipment for motor cars having a single hydraulic shock-absorber, a casing therefor rigidly attached to the sprung mass, a reciprocating member within said casing operatively connected to a shaft support in said casing forming a section of a torque-bar, laterally extended sections connected at each end of said shock-absorber shaft and supported thereby and each having at its side of the sprung mass a bearing for oscillatable support, connections between each end section of the torque-bar and wheel means of the unsprung mass whereby relative movement of the latter with respect to the sprung mass at each side of the motor car causes like and equal oscillation of both torque-bar end sections.

15. Stabilizer-shock-absorber equipment for motor cars having a single shock-absorber rigidly attached to the sprung mass of the car, a coupling on each side of the shock-absorber, a stabilizer member attached to each coupling and extending laterally to the side frame of the sprung mass, a bearing for the lateral end of said member, and a shock lever arm attached to the stabilizer member on the outer side of said bearing.

16. Stabilizer-shock-absorber equipment having a single shock-absorber rigidly secured to the sprung mass, a stabilizer force transmitting member attached to each side of the shock-absorber and having a shock lever arm secured between its ends, and a bearing for the side support of the member beyond the shock arm.

17. In an automobile stabilizer-shock-absorber equipment for cooperation between sprung and unsprung masses of the automobile, comprising an hydraulic shock-absorber secured to one of the masses, a shaft supported therein, detachable torque-bar sections at each side in substantial axial alignment with the shaft of the shock-absorber, and means for ready attachment and detachment of the torque-bar sections from the shock-absorber shaft.

18. In an automobile ride-stabilizer equipment, a sprung and an unsprung mass, a single shock-absorber supported fixedly with respect to one of said masses, a torque-bar section extending from each side of said shock-absorber with one end supported thereby and having means of support for the other end of each torque-bar section, both supports permitting ready attachment of the torque-bar sections without detaching the shock-absorber from its support.

19. In a stabilizer-shock-absorber equipment for motor cars, a sprung mass and an unsprung mass, a single shock-absorber adapted to be secured to one of said masses, a shock-absorber shaft extending beyond each side of the shock-absorber, and means on each end of said shock-absorber shaft for ready attachment and detachment of a section of transverse force-transmitting stabilizing means.

20. A shock-absorber for a motor car having a casing, a shaft supported in said casing and having both its ends accessible respectively from each side of the casing, and embodying means whereby car stabilizing means may be readily attached and detached from each end of the shock-absorber shaft.

CHARLES B. HUNTMAN.